(12) United States Patent
Hotelling et al.

(10) Patent No.: US 8,153,016 B2
(45) Date of Patent: Apr. 10, 2012

(54) SHAPING A COVER GLASS

(75) Inventors: Steve Porter Hotelling, San Jose, CA (US); John Z. Zhong, Cupertino, CA (US); Joseph Edward Clayton, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 1094 days.

(21) Appl. No.: 12/030,052

(22) Filed: Feb. 12, 2008

(65) Prior Publication Data

US 2009/0090694 A1    Apr. 9, 2009

(51) Int. Cl.
*C23F 3/00*    (2006.01)
(52) U.S. Cl. ............... 216/80; 216/13; 216/67; 438/404
(58) Field of Classification Search ............ 216/13, 216/19, 80, 20, 3, 4, 59, 65, 67; 438/404, 438/405
See application file for complete search history.

(56) References Cited

U.S. PATENT DOCUMENTS

| | | | |
|---|---|---|---|
| 4,960,719 A | | 10/1990 | Tanaka et al. |
| 5,314,771 A | * | 5/1994 | Yamauchi et al. ............. 430/7 |
| 5,317,919 A | * | 6/1994 | Awtrey ............................ 73/718 |
| 5,483,261 A | | 1/1996 | Yasutake |
| 5,488,204 A | | 1/1996 | Mead et al. |
| 5,825,352 A | | 10/1998 | Bisset et al. |
| 5,835,079 A | | 11/1998 | Shieh |
| 5,880,411 A | | 3/1999 | Gillespie et al. |
| 6,090,678 A | | 7/2000 | Maghsoudnia |
| 6,188,391 B1 | | 2/2001 | Seely et al. |
| 6,310,610 B1 | | 10/2001 | Beaton et al. |
| 6,323,846 B1 | | 11/2001 | Westerman et al. |
| 6,690,387 B2 | | 2/2004 | Zimmerman et al. |
| 7,015,894 B2 | | 3/2006 | Morohoshi |
| 7,098,395 B2 | * | 8/2006 | Hiraishi et al. ............. 136/251 |
| 7,184,064 B2 | | 2/2007 | Zimmerman et al. |
| 7,663,607 B2 | | 2/2010 | Hotelling et al. |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2006/078374 A1 | 7/2006 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Lan Vinh
(74) *Attorney, Agent, or Firm* — Morrison & Foerster LLP

(57) ABSTRACT

The fabrication of a touch sensor panel having co-planar single-layer touch sensors fabricated on the back side of a cover glass is disclosed. It can be desirable from a manufacturing perspective to perform all thin-film processing steps on a motherglass before separating it into separate parts. To perform thin-film processing on a motherglass before separation, a removable sacrificial layer such as a photoresist can be applied over the thin-film layers. Next, the motherglass can be scribed and separated, and grinding and polishing steps can be performed prior to removing the sacrificial layer. In alternative embodiments, after the protective sacrificial layer is applied, the bulk of the coverglass can be dry-etched using a very aggressive anisotropic etching that etches primarily in the z-direction. In this embodiment, the etching can be patterned using photolithography to create rounded corners or any other shape. The photoresist can then be removed.

12 Claims, 12 Drawing Sheets

U.S. PATENT DOCUMENTS

| | | |
|---|---|---|
| 7,682,854 B2 * | 3/2010 | Yoo .................................. 438/29 |
| 2003/0077878 A1 | 4/2003 | Kumar et al. |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2008/0158181 A1 | 7/2008 | Hamblin et al. |
| 2008/0309633 A1 | 12/2008 | Hotelling et al. |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

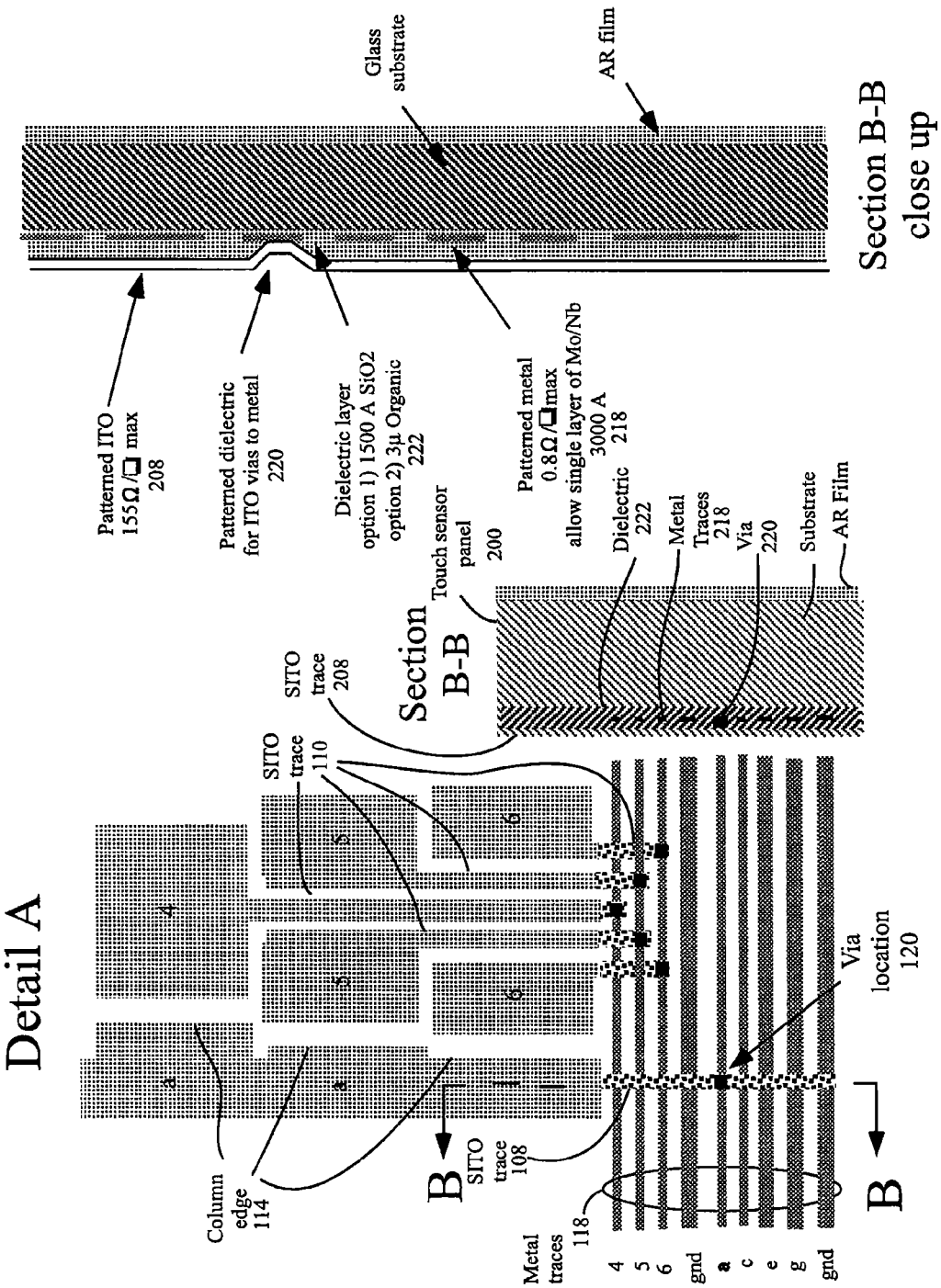

SHAPING A COVER GLASS

FIELD OF THE INVENTION

This relates generally to input devices for computing systems, and more particularly, to the fabrication of a touch sensor panel on the back side of a cover glass.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface. The touch sensor panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch sensor panels can be implemented as an array of pixels formed by multiple drive lines (e.g. rows) crossing over multiple sense lines (e.g. columns), where the drive and sense lines are separated by a dielectric material. An example of such a touch sensor panel is described in Applicant's co-pending U.S. application Ser. No. 11/650,049 entitled "Double-Sided Touch Sensitive Panel and Flex Circuit Bonding," filed on Jan. 3, 2007, the contents of which are incorporated by reference herein. However, touch sensor panels having drive and sense lines formed on the bottom and top sides of a single substrate can be expensive to manufacture. One reason for this additional expense is that thin-film processing steps must be performed on both sides of the glass substrate, which requires protective measures for the processed side while the other side is being processed. Another reason is the cost of the flex circuit fabrication and bonding needed to connect to both sides of the substrate.

SUMMARY OF THE INVENTION

This relates to the fabrication of a touch sensor panel having touch sensors fabricated on a substrate for detecting touch events (the touching of one or multiple fingers or other objects upon a touch-sensitive surface at distinct locations at about the same time). When forming a touch sensor panel on a substrate, if the substrate is singulated before processing, the separation step is relatively easy to accomplish with laser or wheel scribing and breaking, followed by optional grinding and polishing to achieve a cosmetically pleasing shape and touch. Because separation is performed before processing, protection of sensitive circuitry during grinding and polishing is not needed. However, it can be desirable from a manufacturing perspective to perform all processing steps on a substrate sheet before separating it into separate parts with rounded corners (in the case of no bezel).

To perform processing on a substrate sheet before separation, a removable sacrificial layer such as a photoresist can be applied over the sensitive circuitry. Next, the parts can be scribed and separated to get individual parts, and grinding and polishing steps can be performed prior to removing the sacrificial layer. In alternative embodiments, after the protective sacrificial layer is applied, the bulk of the substrate sheet can be dry-etched using a very aggressive anisotropic etching that etches primarily in the z-direction. This process is similar to reactive ion etching, in which photoresist is applied to the areas to be preserved, and the unwanted areas are then etched away. In this embodiment, the etching can be patterned using photolithography to create rounded corners or any other shape. The photoresist can then be removed.

In further alternative embodiments, dry etching can be utilized on a blank substrate sheet to etch partially through the sheet to form the radiused corners or other shapes. The substrate sheet can then be subjected to processing to apply various layers of the touch sensor panel, followed by laser scribing and breaking to singulate the parts. This process avoids the need to submit the sensitive layers to the bulk shaping etch process, which might damage them.

BRIEF DESCRIPTION OF THE DRAWINGS

FIG. 1c illustrates an exemplary connection of columns and row patches to metal traces in the border area of the touch sensor panel according to one embodiment of this invention.

FIG. 2a illustrates an exemplary cross-section of a touch sensor panel showing single-layer Indium Tin Oxide (SITO) traces and metal traces connected though a via in a dielectric material according to one embodiment of this invention.

FIG. 2b is a close-up view of the exemplary cross-section shown in FIG. 2a according to one embodiment of this invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to the fabrication of a touch sensor panel with touch sensors formed on a substrate. It can be desirable from a manufacturing perspective to perform all touch sensor processing steps on a single substrate sheet before separating it into separate parts with rounded corners (in the case of no bezel). To perform touch sensor processing on the substrate sheet before separation, a removable sacrificial layer such as a photoresist can be applied over the thin-film layers. Next, the parts can be scribed and separated to get individual parts, and grinding and polishing steps can be performed prior to removing the sacrificial layer. In alternative embodiments, after the protective sacrificial layer is applied, the bulk of the substrate can be dry-etched using a very aggressive anisotropic etching that etches primarily in the z-direction. In this embodiment, the etching can be patterned using photolithography to create rounded corners or any other shape. The photoresist can then be removed.

Although some embodiments of this invention may be described herein in terms of mutual capacitance multi-touch sensor panels, it should be understood that embodiments of this invention are not so limited, but can be additionally applicable to self-capacitance sensor panels and single-touch sensor panels. Furthermore, although the touch sensors in the sensor panel may be described herein in terms of an orthogonal array of touch sensors having rows and columns, embodiments of this invention are not limited to orthogonal arrays, but can be generally applicable to touch sensors arranged in any number of dimensions and orientations, including diagonal, concentric circle, three-dimensional and random orientations.

Additionally, although some embodiments of the invention may be described herein in terms of substantially transparent touch sensor panels, in other embodiments the touch sensor panel can be opaque. Although the touch sensors may be described herein as being formed as a co-planar single-layer on a substrate, in other embodiments, the touch sensors can be formed from non-coplanar layers on a single substrate. In some embodiments, the substrate is described as being the back side of a cover glass, with the original single substrate sheet being referred to as a motherglass, but it should be understood that embodiments of the invention are generally applicable to other substrates as well. In some embodiments, the touch sensors are formed using thin-film processing techniques, but other processing techniques can also be used.

Figure 1A:
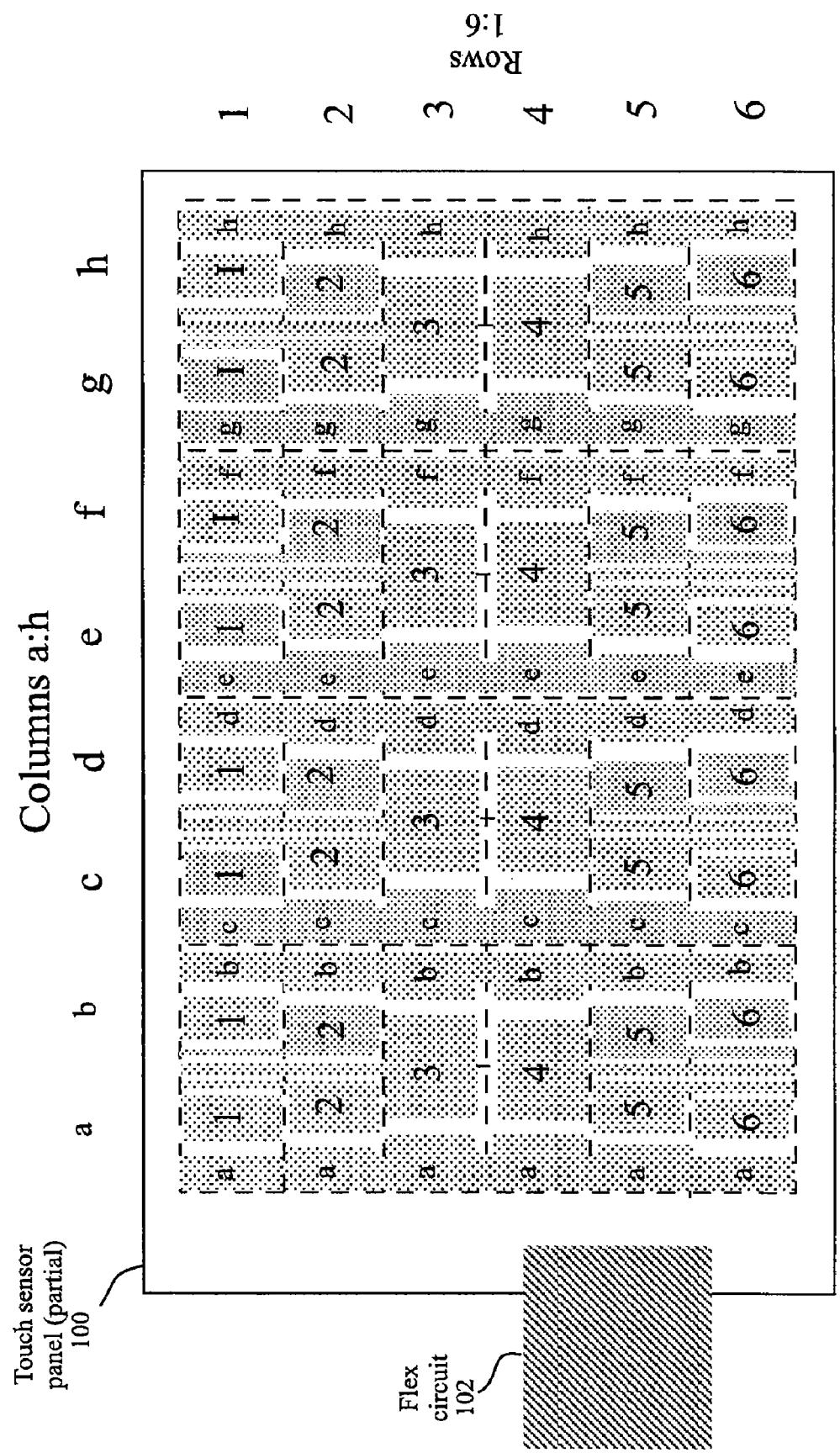
FIG. 1a illustrates a partial top view of an exemplary substantially transparent touch sensor panel having co-planar single-layer touch sensors fabricated on a single side of a substrate according to one embodiment of this invention.

FIG. 1a illustrates a partial view of exemplary substantially transparent touch sensor panel 100 having co-planar single-layer touch sensors fabricated on a single side of a substrate according to embodiments of the invention. In the example of FIG. 1a, touch sensor panel 100 having eight columns (labeled a through h) and six rows (labeled 1 through 6) is shown, although it should be understood that any number of columns and rows can be employed. Columns a through h can generally be columnar in shape, although in the example of FIG. 1a, one side of each column includes staggered edges and notches designed to create separate sections in each column. Each of rows 1 through 6 can be formed from a plurality of distinct patches or pads, each patch including a trace of the same material as the patch and routed to the border area of touch sensor panel 100 for enabling all patches in a particular row to be connected together through metal traces (not shown in FIG. 1a) running in the border areas. These metal traces can be routed to a small area on one side of touch sensor panel 100 and connected to a flex circuit 102. As shown in the example of FIG. 1a, the patches forming the rows can be arranged in a generally pyramid-shaped configuration. In FIG. 1a, for example, the patches for rows 1-3 between columns a and b are arranged in an inverted pyramid configuration, while the patches for rows 4-6 between columns a and b are arranged in an upright pyramid configuration.

The columns and patches of FIG. 1a can be formed in a co-planar single layer of conductive material. In touch screen embodiments, the conductive material can be a substantially transparent material such as Single-layer Indium Tin Oxide (SITO), although other materials can also be used. The SITO layer can be formed either on the back of a cover glass or on the top of a separate substrate. Although SITO may be referred to herein for purposes of simplifying the disclosure, it should be understood that other conductive materials can also be used according to embodiments of the invention.

Figure 1B:
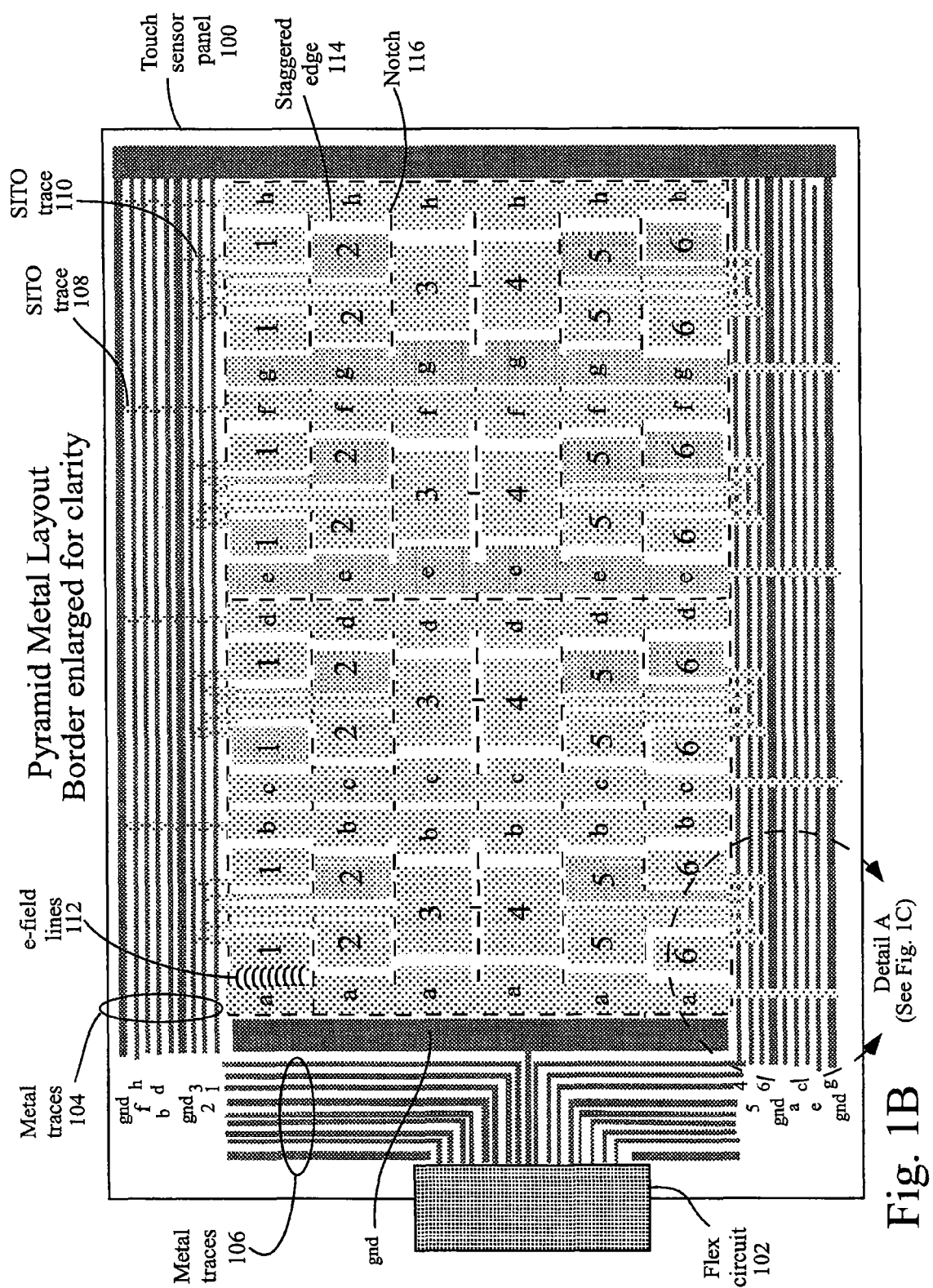
FIG. 1b illustrates a partial top view of an exemplary substantially transparent touch sensor panel including metal traces running in the border areas of the touch sensor panel according to one embodiment of this invention.

FIG. 1b illustrates a partial view of exemplary substantially transparent touch sensor panel 100 including metal traces 104 and 106 running in the border areas of the touch sensor panel according to embodiments of the invention. Note that the border areas in FIG. 1b are enlarged for clarity. Each column a-h can include SITO trace 108 that allows the column to be connected to a metal trace through a via (not shown in FIG. 1b). One side of each column includes staggered edges 114 and notches 116 designed to create separate sections in each column. Each row patch 1-6 can include SITO trace 110 that allows the patch to be connected to a metal trace through a via (not shown in FIG. 1b). SITO traces 110 can allow each patch in a particular row to be self-connected to each other. Because all metal traces 104 and 106 are formed on the same layer, they can all be routed to the same flex circuit 102.

If touch sensor panel 100 is operated as a mutual capacitance touch sensor panel, either the columns a-h or the rows 1-6 can be driven with one or more stimulation signals, and fringing electric field lines can form between adjacent column areas and row patches. In FIG. 1b, it should be understood that although only electric field lines 112 between column a and row patch 1 (a-1) are shown for purposes of illustration, electric field lines can be formed between other adjacent column and row patches (e.g. a-2, b-4, g-5, etc.) depending on what columns or rows are being stimulated. Thus, it should be understood that each column-row patch pair (e.g. a-1, a-2, b-4, g-5, etc.) can represent a two-electrode pixel or sensor at which charge can be coupled onto the sense electrode from the drive electrode. When a finger touches down over one of these pixels, some of the fringing electric field lines that extend beyond the cover of the touch sensor panel are blocked by the finger, reducing the amount of charge coupled onto the sense electrode. This reduction in the amount of coupled charge can be detected as part of determining a resultant "image" of touch. It should be noted that in mutual capacitance touch sensor panel designs as shown in FIG. 1b, no separate reference ground is needed, so no second layer on the back side of the substrate, or on a separate substrate, is needed.

However, touch sensor panel 100 can also be operated as a self-capacitance touch sensor panel. In such an embodiment, a reference ground plane can be formed on the back side of the substrate or on a separate substrate. In a self-capacitance touch sensor panel, each pixel or sensor has a self-capacitance to the reference ground that can be changed due to the presence of a finger. In self-capacitance embodiments, the self-capacitance of columns a-h can be sensed independently, and the self-capacitance of rows 1-6 can also be sensed independently.

FIG. 1c illustrates an exemplary connection of columns and row patches to the metal traces in the border area of the touch sensor panel according to embodiments of the invention. FIG. 1c represents "Detail A" as shown in FIG. 1b, and shows column "a"and row patches 4-6 connected to metal traces 118 through SITO traces 108 and 110. Because SITO traces 108 and 110 are separated from metal traces 118 by a dielectric material, vias 120 formed in the dielectric material allow the SITO traces to connect to the metal traces.

FIG. 2a illustrates an exemplary cross-section of touch sensor panel 200 showing SITO trace 208 and metal traces 218 connected though via 220 in dielectric material 222 according to embodiments of the invention. FIG. 2a represents view B-B as shown in FIG. 1c.

FIG. 2b is a close-up view of the exemplary cross-section shown in FIG. 2a according to embodiments of the invention. FIG. 2b shows one exemplary embodiment wherein SITO trace 208 has a resistivity of about 155 ohms per square max. In one embodiment, dielectric 222 can be about 1500 angstroms of inorganic $SiO_2$, which can be processed at a higher temperature and therefore allows the SITO layer to be sputtered with higher quality. In another embodiment, dielectric 222 can be about 3.0 microns of organic polymer. The 1500 angstroms of inorganic $SiO_2$ can be used for touch sensor panels small enough such that the crossover capacitance (between SITO trace 208 and metal traces 218) is not an issue.

For larger touch sensor panels (having a diagonal dimension of about 3 inches or greater), crossover capacitance can be an issue, creating an error signal that can only partially be compensated. Thus, for larger touch sensor panels, a thicker dielectric layer 222 with a lower dielectric constant such as about 3.0 microns of organic polymer can be used to lower the crossover capacitance. However, use of a thicker dielectric layer can force the SITO layer to be sputtered at a lower temperature, resulting in lower optical quality and higher resistivity.

Referring again to the example of FIG. 1c, column edges 114 and row patches 4-6 can be staggered in the x-dimension because space must be made for SITO traces 110 connecting row patches 4 and 5. (It should be understood that row patch 4 in the example of FIG. 1c is really two patches stuck together.) To gain optimal touch sensitivity, it can be desirable to balance the area of the electrodes in pixels a-6, a-5 and a-4. However, if column "a" was kept linear, row patch 6 can be slimmer than row patch 5 or 6, and an imbalance would be created between the electrodes of pixel a-6.

Figure 3:
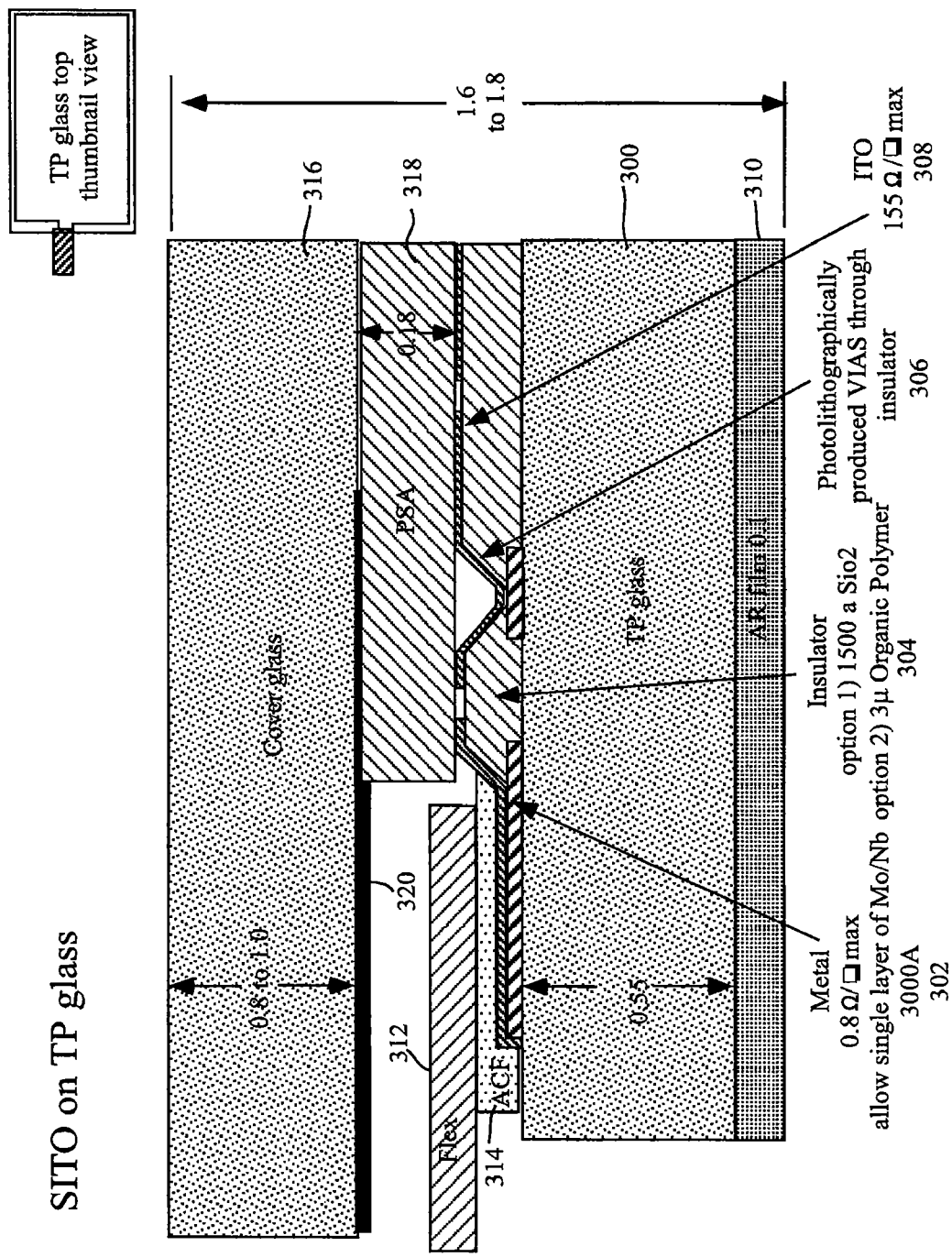
FIG. 3 illustrates an exemplary stackup of SITO on a touch sensor panel substrate bonded to a cover glass according to one embodiment of this invention.

FIG. 3 illustrates an exemplary stackup of SITO on a touch sensor panel substrate bonded to a cover glass according to embodiments of the invention. The stackup can include touch sensor panel substrate 300, which can be formed from glass, upon which anti-reflective (AR) film 310 can be formed on one side and metal 302 can be deposited and patterned on the other side to form the bus lines in the border areas. Metal 302 can have a resistivity of 0.8 ohms per square maximum. Insulating layer 304 can then be deposited over substrate 300 and metal 302. Insulating layer can be, for example, $SiO_2$ with a thickness of 1500 angstroms, or 3 microns of organic polymer. Photolithography can be used to form vias 306 in insulator 304, and conductive material 308 can then deposited and patterned on top of the insulator and metal 302. The single layer of conductive material 308, which can be formed from transparent conductive material such as ITO having a resistivity of 155 ohms per square maximum, can be more transparent than multi-layer designs, and can be easier to manufacture. Flex circuit 312 can be bonded to conductive material 303 and metal 302 using adhesive 314 such as anisotropic conductive film (ACF). The entire subassembly can then be bonded to cover glass 316 and black mask 320 using adhesive 318 such as pressure sensitive adhesive (PSA).

Figure 4A:
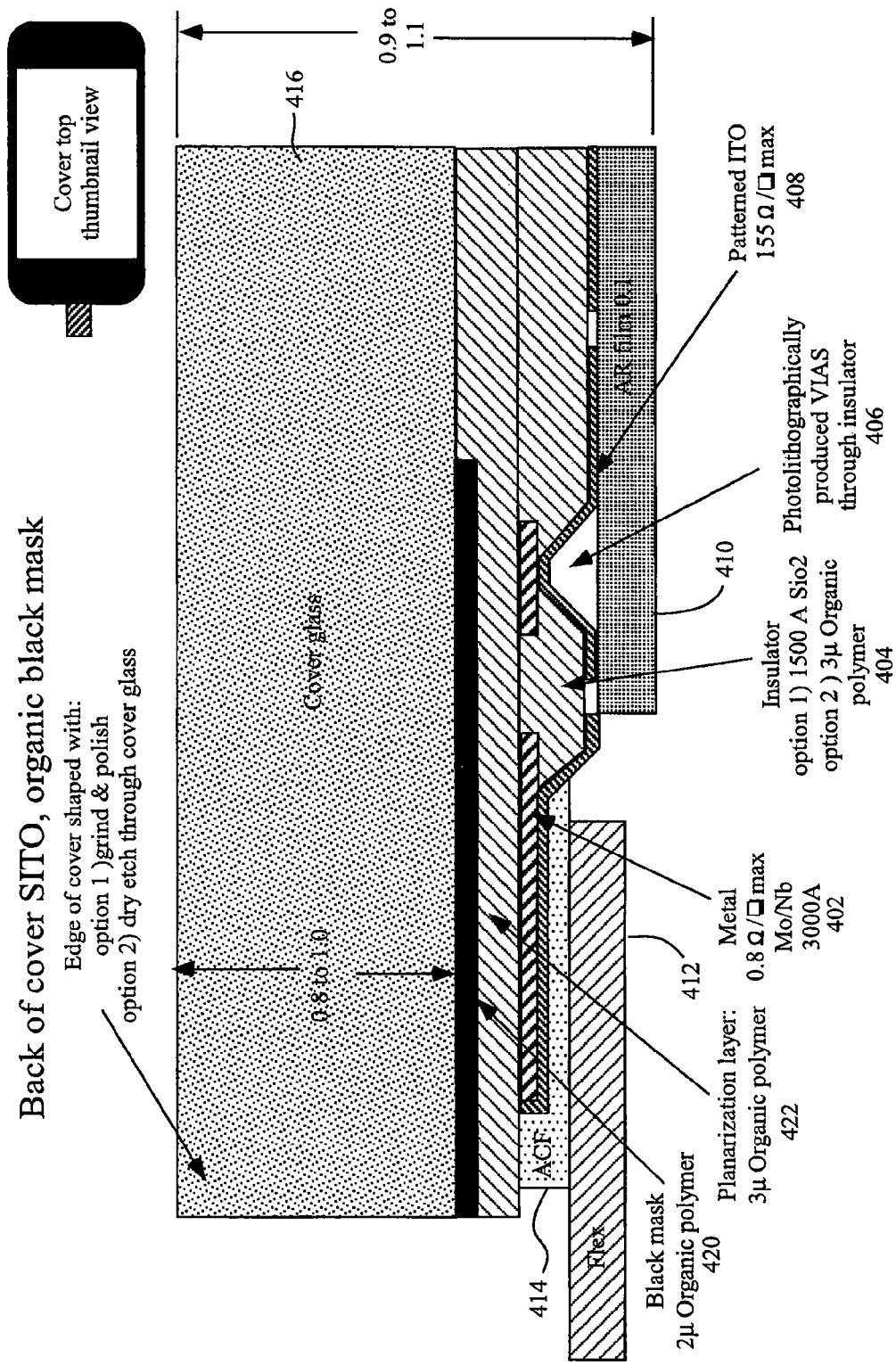
FIG. 4a illustrates an exemplary stackup of SITO formed on the back of a cover glass according to one embodiment of this invention.

FIG. 4a illustrates an exemplary stackup of SITO formed on the back of a cover glass according to embodiments of the invention. The stackup can include cover material 416, which can be formed from glass. Black mask 420 of a material such as 2 microns of organic polymer can be formed on the back side of cover material 416. An optional planarization layer 422 can be formed over cover material 416 and black mask 420 to prepare the surface for subsequent thin-film deposition of metal 402 and insulating layer 404. Metal 402 can be deposited and patterned over optional planarization layer 422 or directly over black mask 420 and/or cover material 416 to form the bus lines in the border areas. Metal 402 can have a resistivity of 0.8 ohms per square maximum. Insulating layer 404 can then be deposited over metal 402 and optional planarization layer 422. Insulating layer can be, for example, $SiO_2$ with a thickness of 1500 angstroms, or 3 microns of organic polymer. Photolithography can be used to form vias 406 in insulator 404, and conductive material 408 can then deposited and patterned on top of the insulator and metal 402. The single layer of conductive material 408, which can be formed from transparent conductive material such as ITO having a resistivity of 155 ohms per square maximum, can be more transparent than multi-layer designs, and can be easier to manufacture. Flex circuit 412 can be bonded to conductive material 408 and metal 402 using adhesive 414 such as anisotropic conductive film (ACF). Anti-reflective (AR) film 410 can also be formed over conductive material 408.

Figure 4B:
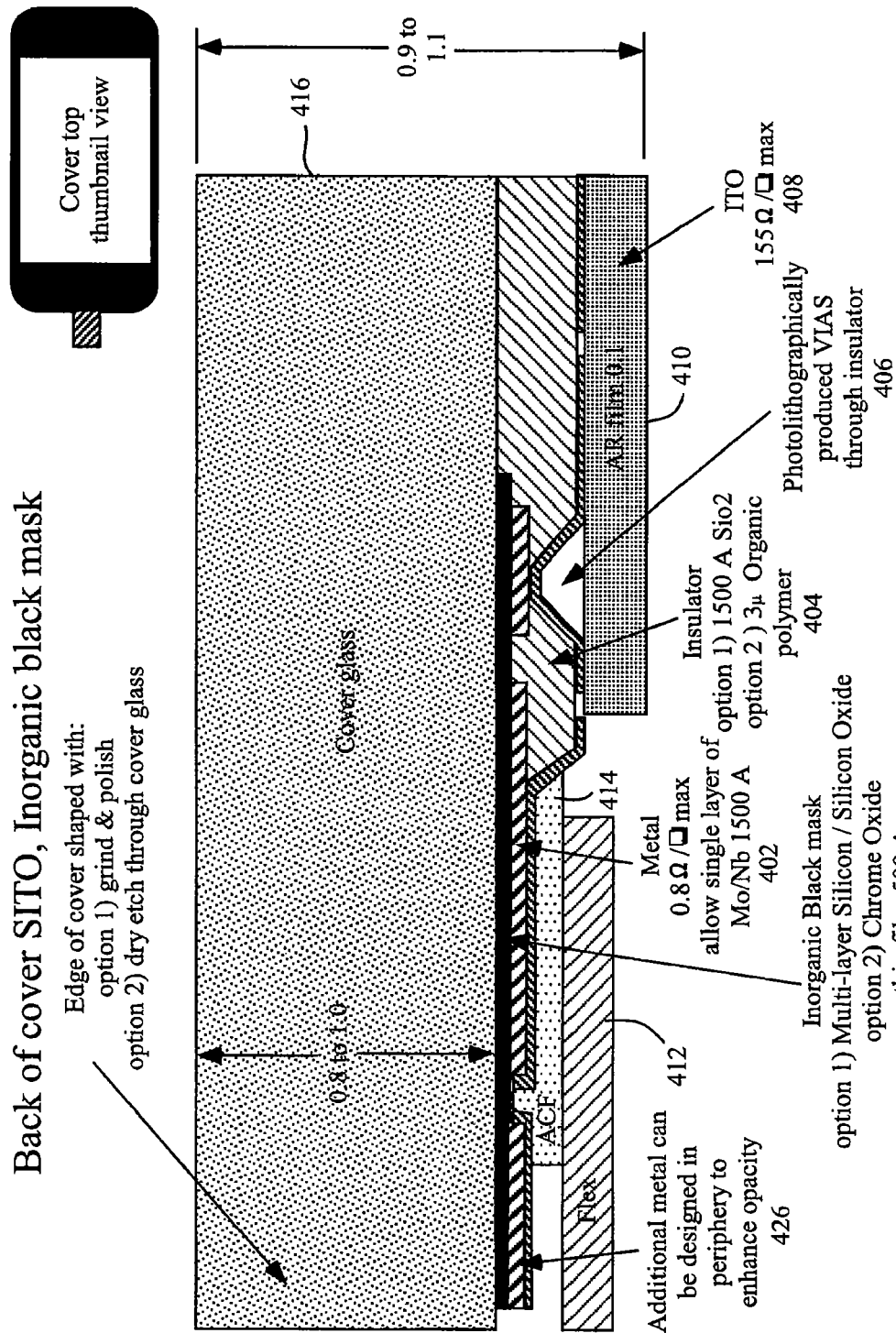
FIG. 4b illustrates another exemplary stackup of SITO formed on the back of a cover glass according to one embodiment of this invention.

FIG. 4b illustrates another exemplary stackup of SITO formed on the back of a cover glass according to embodiments of the invention. FIG. 4b is similar to FIG. 4a, except that inorganic black mask 424 is used instead of organic black mask. Inorganic black mask 424 can be formed from multiple layers of silicon and silicon oxide, or about 500 angstroms of chrome oxide, for example. Inorganic black mask 424 must be a good insulator (greater than 10 MOhms per square) to avoid shorting the metal lines. Inorganic black mask 424 is thinner than organic black mask and helps prevent reflections but is not as good as organic black mask for blocking light. Therefore, the example of FIG. 4b, additional dummy metal 426 can be deposited in addition to metal traces 402 to further block light from passing through.

The forming of a touch sensor panel on the back side of a cover glass can also be applicable to touch sensor panel designs other than the co-planar single layer design disclosed herein. For example, Applicant's co-pending U.S. patent application Ser. No. 11/818,498 entitled "Touch-Sensitive Display" and filed on Jun. 13, 2007, the contents of which are incorporated by reference herein, discloses a touch sensor panel formed from non-co-planar diamond-shaped rows and columns formed on the same side of a substrate. As with FIGS. 4a and 4b herein, the non-co-planar diamond-shaped rows and columns formed on the same side of a substrate can also be formed on the back side of a cover glass.

Figure 5A:
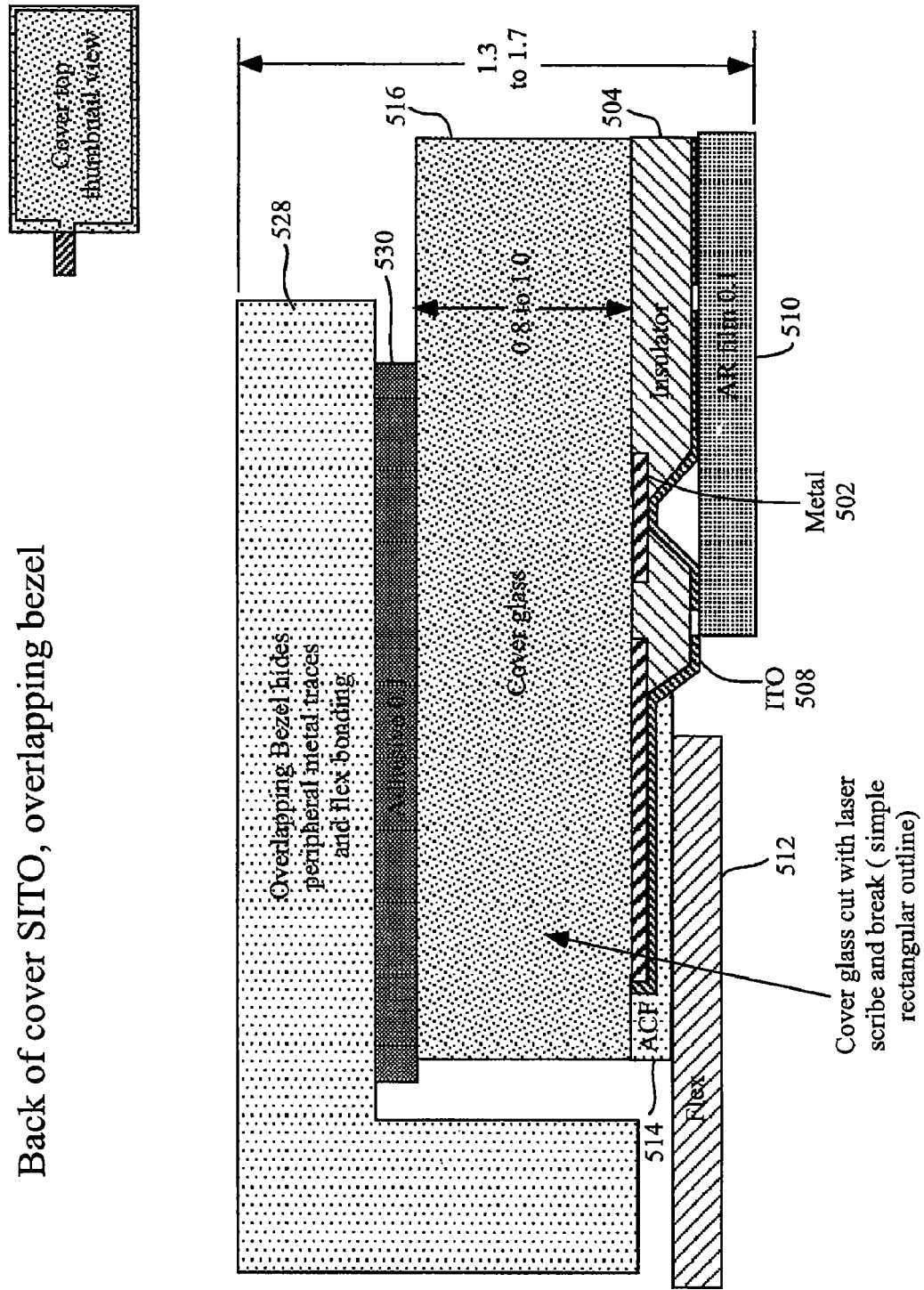
FIG. 5a illustrates an exemplary stackup of SITO formed on the back of a cover glass and bonded to an overlapping bezel according to one embodiment of this invention.

FIG. 5a illustrates an exemplary stackup of SITO formed on the back of a cover glass and bonded to an overlapping bezel according to embodiments of the invention. The stackup in FIG. 5a is similar to what is shown in FIGS. 4a and 4b, except that no black mask or planarization layer is formed on the back of cover glass 516. In FIG. 5a, cover glass 516 can be bonded under an overhanging bezel 528 using adhesive 530, which eliminates the need for black mask and extra metal for blocking purposes, and simplifies the manufacturing steps. However, this design increases the thickness in the z-dimension.

Figure 5B:
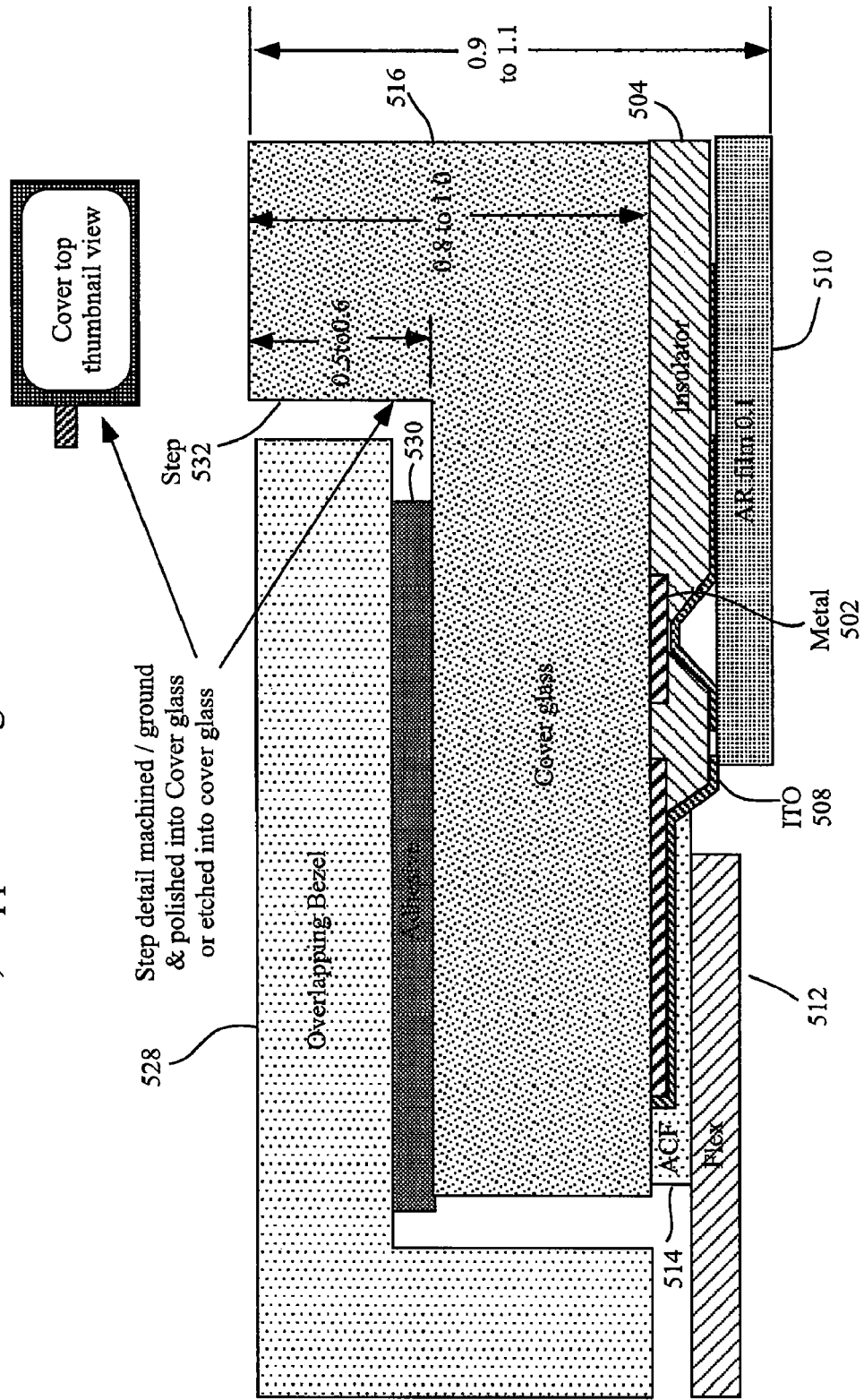
FIG. 5b illustrates an exemplary stackup of SITO formed on the back of a stepped cover glass and bonded to an overlapping bezel according to one embodiment of this invention.

FIG. 5b illustrates an exemplary stackup of SITO formed on the back of a stepped cover glass and bonded to an overlapping bezel according to embodiments of the invention. The embodiment of FIG. 5b reduces the thickness in the z-dimension by creating step 532 in cover glass 516. Step 532 can make cover glass 516 and product bezel 528 substantially coplanar using a lap joint.

The formation of a step in the coverglass can be performed for multiple touch sensor panels while the cover glass is still in a single large sheet, the single sheet referred to herein as a motherglass. First, etching can be used to create the steps in the motherglass for multiple parts. Next, individual touch sensor panel cover glass parts can be singulated using traditional scribe and break processes, or using a further etching step.

When forming a touch sensor panel on the back of a cover glass, if the cover glass is singulated before thin-film processing, the separation step is relatively easy to accomplish with laser or wheel scribing and breaking, followed by optional grinding and polishing to achieve a cosmetically pleasing shape and touch. Because separation is performed before thin-film processing, protection of the thin-films during grinding and polishing is not needed. However, it can be desirable from a manufacturing perspective to perform all thin-film processing steps on a motherglass before separating it into separate parts with rounded corners (in the case of no bezel). To perform thin-film processing on a motherglass before separation, a removable sacrificial layer such as a photoresist is applied over the thin-film layers. Next, the parts can be scribed and separated to get individual parts, and grinding and polishing steps can be performed prior to removing the sacrificial layer. In alternative embodiments, after the protective sacrificial layer is applied, the bulk of the cover-glass can be dry-etched using a very aggressive anisotropic etching that etches primarily in the z-direction. This process is similar to reactive ion etching, in which photoresist is applied to the areas to be preserved, and the unwanted areas are then etched away. In this embodiment, the etching can be patterned using photolithography to create rounded corners or any other shape. The photoresist can then be removed.

In further alternative embodiments, dry etching can be utilized on a blank motherglass to etch partially through the motherglass to form the radiused corners or other shapes. The motherglass can then be subjected to thin film processing, followed by laser scribing and breaking to singulate the parts. This process avoids needing to submit the thin films to the bulk shaping etch process, which might damage them.

Figure 6A:
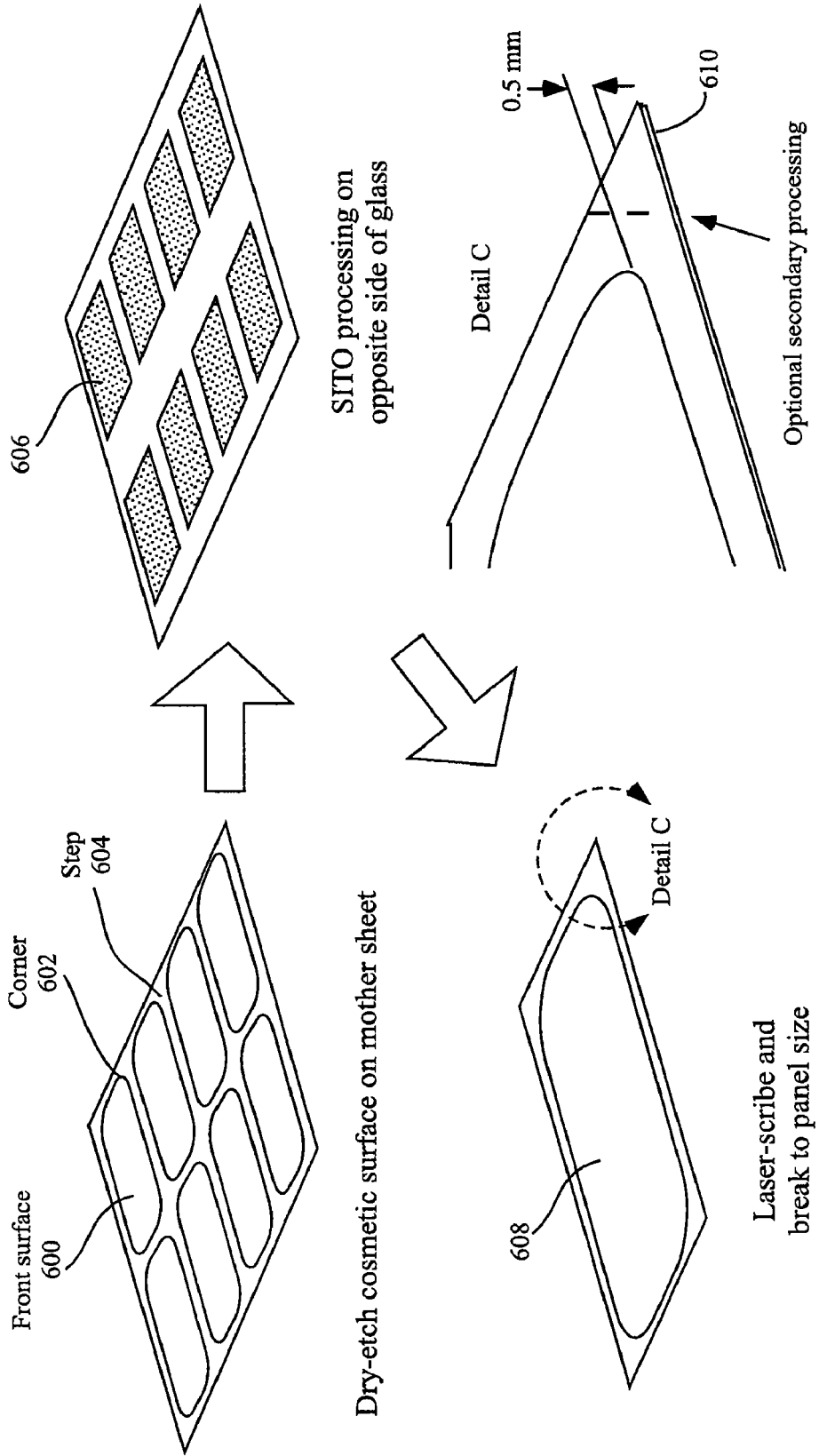
FIGS. 6a and 6b illustrate exemplary processing for combining dry-etch shaping with thin film deposition on the cover glass according to one embodiment of this invention.
Figure 6B:
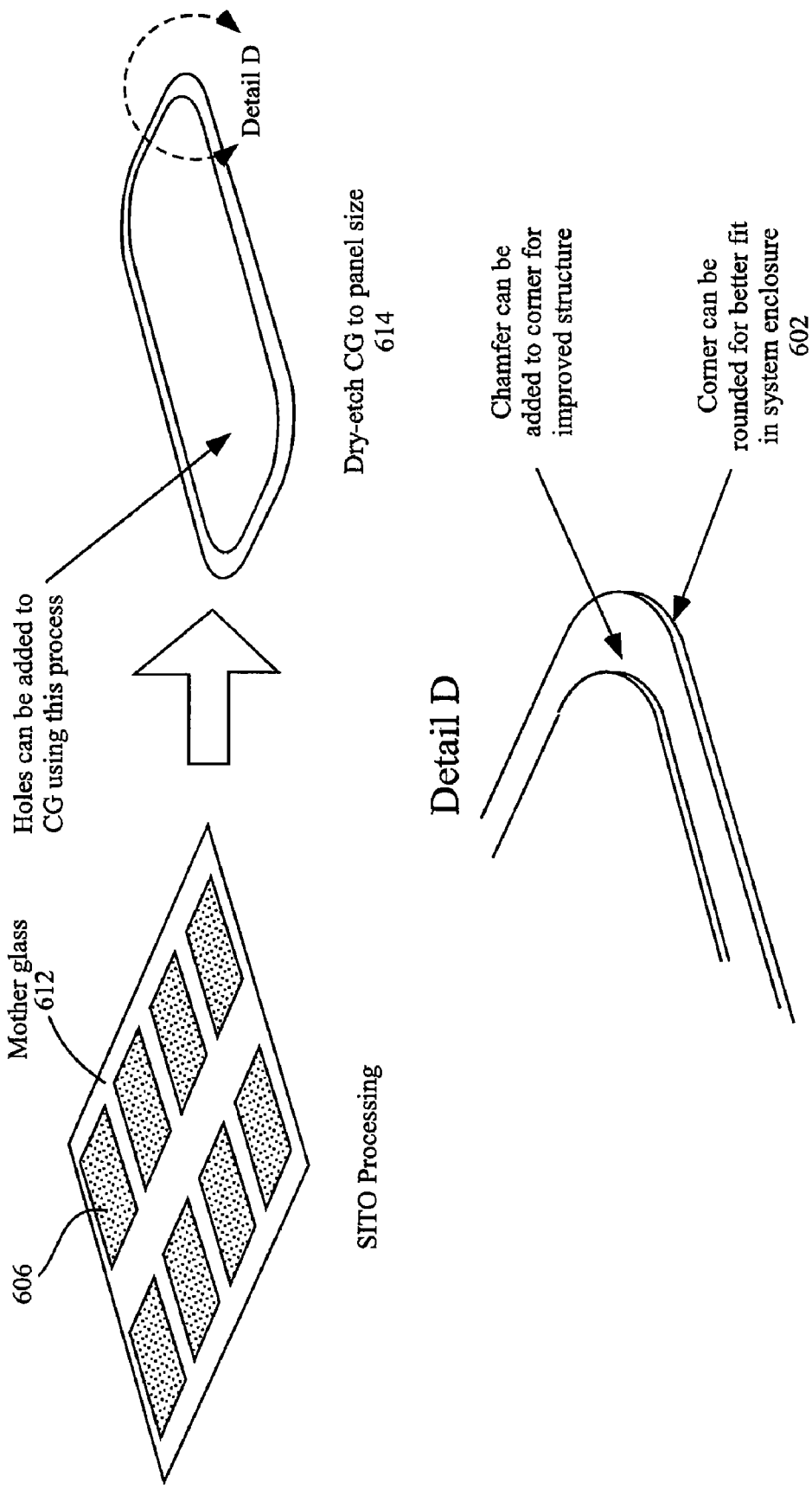

FIGS. 6a and 6b illustrate exemplary processing for combining dry-etch shaping with thin film deposition on the cover glass according to embodiments of the invention. In FIG. 6a, the front cosmetic surface 600 is dry-etched partially through the front side of the motherglass to form the cosmetic corners 602 and step 604 in the glass. The motherglass will then go to thin film processing at 606 and finally laser-scribed and broken to panel size 608. This method produces sharp corner 610 on the bottom ledge that can be removed.

FIG. 6b illustrates the reverse process. Thin films 606 are deposited on motherglass 612. The motherglass can then be sent through for dry-etching to size (see reference character 614). The dry etching process should not damage the thin films. Using this process, bottom corner 602 can be shaped and holes can be added the glass. The process chosen will be dependent on individual product requirements.

Figure 7:
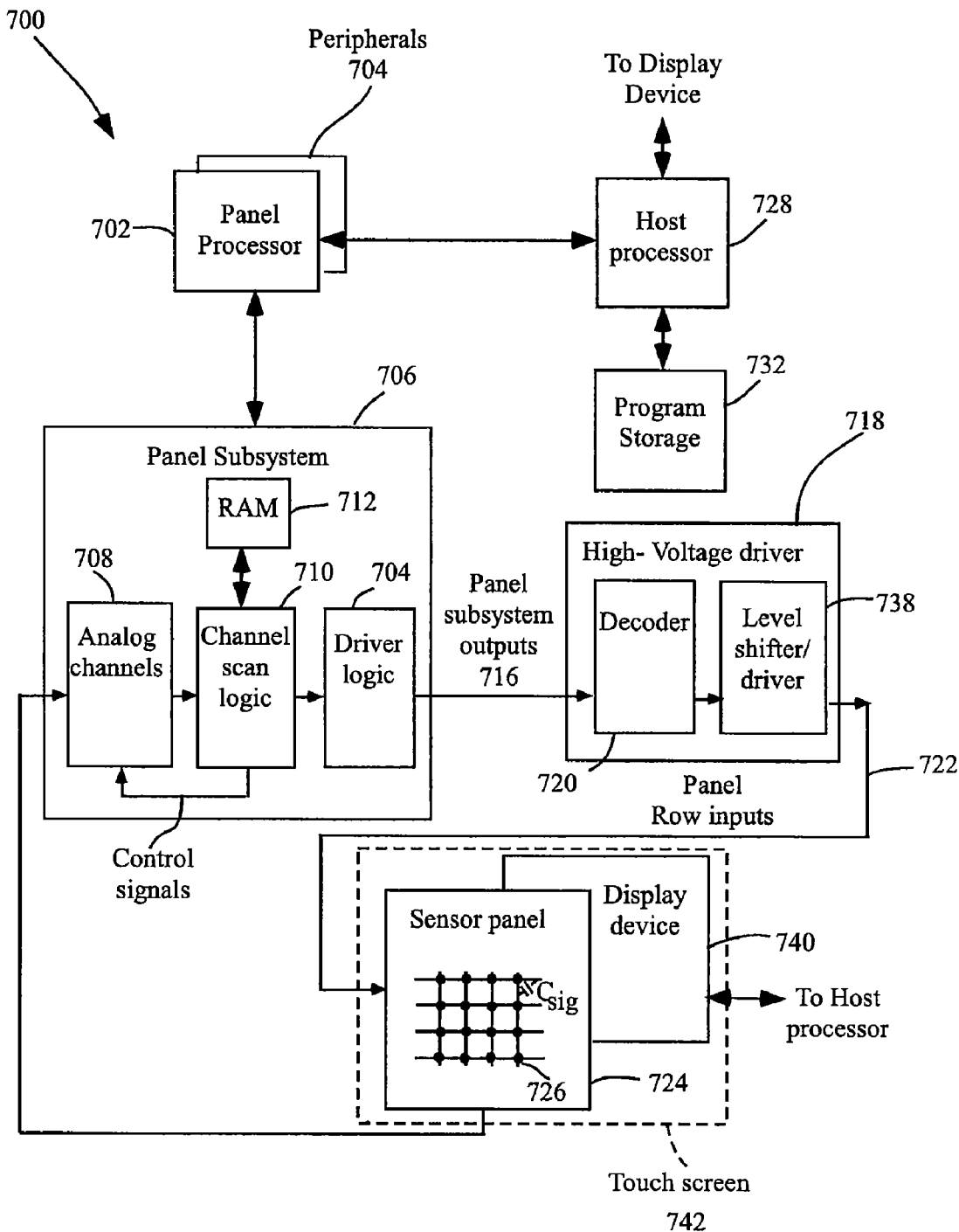
FIG. 7 illustrates an exemplary computing system operable with a touch sensor panel according to one embodiment of this invention.

FIG. 7 illustrates exemplary computing system 700 operable with the touch sensor panel described above according to embodiments of this invention. Touchscreen 742, which can include touch sensor panel 724 and display device 740 (e.g. an LCD module), can be connected to other components in computing system 700 through connectors integrally formed on the sensor panel, or using flex circuits. Computing system 700 can include one or more panel processors 702 and peripherals 704, and panel subsystem 706. The one or more processors 702 can include, for example, ARM968 processors or other processors with similar functionality and capabilities. However, in other embodiments, the panel processor functionality can be implemented instead by dedicated logic such as a state machine. Peripherals 704 can include, but are not limited to, random access memory (RAM) or other types of memory or storage, watchdog timers and the like.

Panel subsystem 706 can include, but is not limited to, one or more analog channels 708, channel scan logic 710 and driver logic 714. Channel scan logic 710 can access RAM 712, autonomously read data from the analog channels and provide control for the analog channels. This control can include multiplexing or otherwise connecting the sense lines of touch sensor panel 724 to analog channels 708. In addition, channel scan logic 710 can control the driver logic and stimulation signals being selectively applied to the drive lines of touch sensor panel 724. In some embodiments, panel subsystem 706, panel processor 702 and peripherals 704 can be integrated into a single application specific integrated circuit (ASIC).

Driver logic 714 can provide multiple panel subsystem outputs 716 and can present a proprietary interface that drives high voltage driver 718. High voltage driver 718 can provide level shifting from a low voltage level (e.g. complementary metal oxide semiconductor (CMOS) levels) to a higher voltage level, providing a better signal-to-noise (S/N) ratio for noise reduction purposes. Panel subsystem outputs 716 can be sent to decoder 720 and level shifter/driver 738, which can selectively connect one or more high voltage driver outputs to one or more panel row or drive line inputs 722 through a proprietary interface and enable the use of fewer high voltage driver circuits in the high voltage driver 718. Each panel row input 722 can drive one or more drive lines in touch sensor panel 724. In some embodiments, high voltage driver 718 and decoder 720 can be integrated into a single ASIC. However, in other embodiments high voltage driver 718 and decoder 720 can be integrated into driver logic 714, and in still other embodiments high voltage driver 718 and decoder 720 can be eliminated entirely.

Computing system 700 can also include host processor 728 for receiving outputs from panel processor 702 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 728 can also perform additional functions that may not be related to panel processing, and can be coupled to program storage 732 and display device 740 such as an LCD for providing a user interface (UI) to a user of the device.

The touch sensor panel described above can be advantageously used in the system of FIG. 7 to provide a space-efficient touch sensor panel and UI that is lower cost, more manufacturable, and fits into existing mechanical control outlines (the same physical envelope).

Figure 8A:
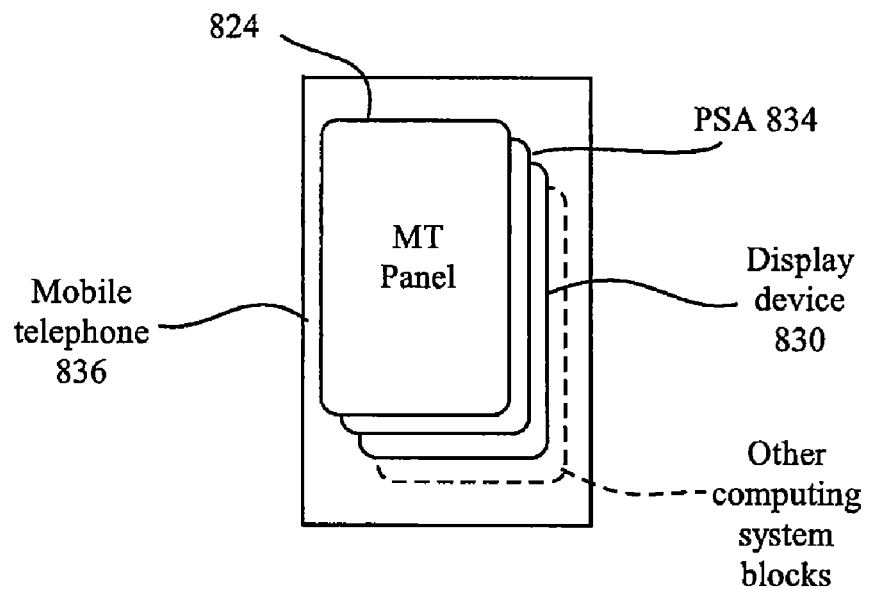
FIG. 8a illustrates an exemplary mobile telephone that can include a touch sensor panel and computing system according to one embodiment of this invention.
Figure 8B:
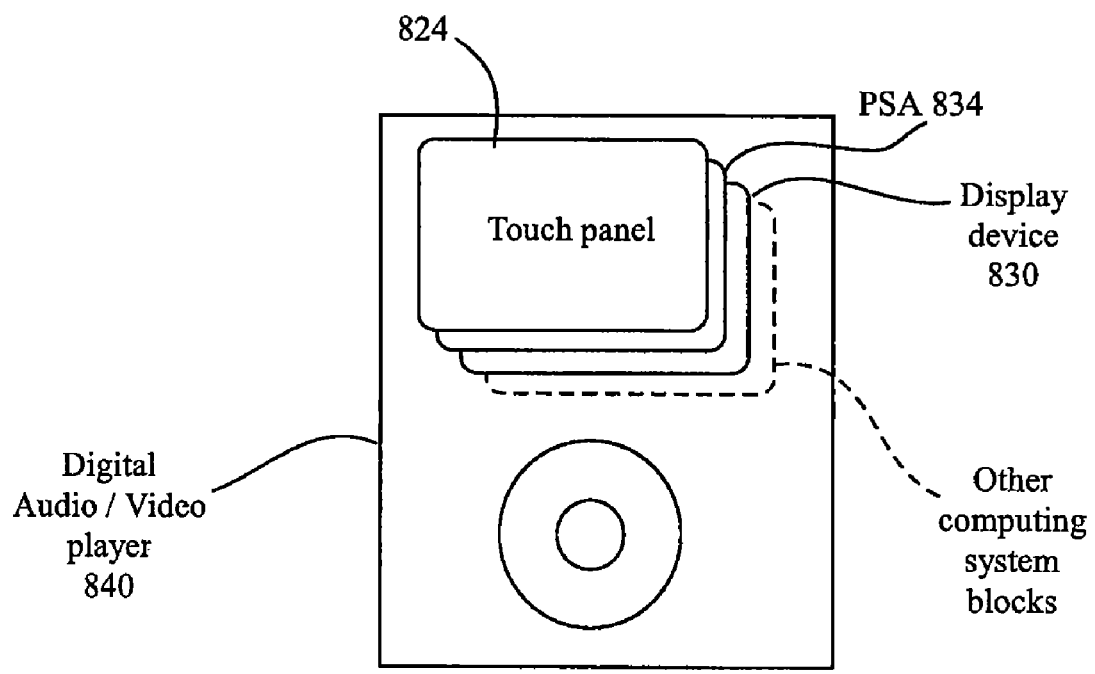
FIG. 8b illustrates an exemplary digital audio/video player that can include a touch sensor panel and computing system according to one embodiment of this invention.

FIG. 8a illustrates exemplary mobile telephone 836 that can include touch sensor panel 824 and display device 830 stackups (optionally bonded together using PSA 834) and computing system described above according to embodiments of the invention. FIG. 8b illustrates exemplary digital audio/video player 840 that can include touch sensor panel 824 and display device 830 stackups (optionally bonded together using PSA 834) and computing system described above according to embodiments of the invention. The mobile telephone and digital audio/video player of FIGS. 8a and 8b can advantageously benefit from the touch sensor panel described above because the touch sensor panel can enable these devices to be smaller and less expensive, which are important consumer factors that can have a significant effect on consumer desirability and commercial success.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of fabricating a plurality of touch sensor panels on one side of a substrate, comprising:
    etching partially through a substrate sheet on a first side of first and second opposing sides of the substrate sheet;
    forming the plurality of touch sensor panels on the second side of the substrate sheet;
    applying a removable protective sacrificial layer over the touch sensor panels;
    singulating the substrate sheet to separate the plurality of touch sensor panels; and
    removing the protective sacrificial layer from each of the plurality of touch sensor panels.

2. The method of claim 1, further comprising forming each touch sensor panel as a plurality of co-planar single-layer touch sensors.

3. The method of claim 1, further comprising forming the plurality of touch sensor panels using thin-film processing.

4. The method of claim 1, wherein the substrate is a cover glass and the substrate sheet is a mother glass.

5. The method of claim 1, further comprising applying photoresist as the removable protective sacrificial layer.

6. The method of claim 1, further comprising singulating the substrate sheet using scribe and break techniques.

7. The method of claim 1, further comprising performing grinding and polishing the separated touch sensor panels prior to removing the sacrificial layer.

8. The method of claim 1, further comprising singulating the substrate sheet using dry-etching techniques.

9. The method of claim 1, further comprising forming a step in the substrate supporting each of the touch sensor panels prior to singulating the substrate sheet.

10. The method of claim 9, further comprising forming the step using etching techniques.

11. The method of claim 1, further comprising forming radiused corners in the substrate supporting each of the touch sensor panels prior to forming the touch sensor panels.

12. The method of claim 11, further comprising forming the radiused corners using etching techniques.

* * * * *